US005708821A

United States Patent [19]

Takikita

[11] Patent Number: 5,708,821

[45] Date of Patent: Jan. 13, 1998

[54] PRINTING APPARATUS AND METHOD OF SAVING POWER OF THE SAME

[75] Inventor: Hiromichi Takikita, Shizuoka, Japan

[73] Assignee: Star Micronics Co., Ltd., Shizuoka, Japan

[21] Appl. No.: 578,434

[22] Filed: Dec. 26, 1995

[30] Foreign Application Priority Data

Jan. 17, 1995 [JP] Japan .................................... 7-005052

[51] Int. Cl.[6] ................................ G06F 1/26; G06F 1/32

[52] U.S. Cl. ............................................ 395/750; 395/113

[58] Field of Search .................................... 395/106, 113, 395/114, 750; 364/707; 347/211; 399/70

[56] References Cited

U.S. PATENT DOCUMENTS

| | | | |
|---|---|---|---|
| 4,841,440 | 6/1989 | Yonezu et al. | 395/750 |
| 4,855,790 | 8/1989 | Suzuki | 355/24 |
| 4,991,114 | 2/1991 | Kawamura et al. | 395/114 |
| 5,018,079 | 5/1991 | Shukunami et al. | 395/106 |
| 5,321,428 | 6/1994 | Dornier | 346/76 |
| 5,483,464 | 1/1996 | Song | 364/492 |
| 5,493,684 | 2/1996 | Gephardt et al. | 395/750 |
| 5,521,686 | 5/1996 | Muto | 355/285 |
| 5,568,594 | 10/1996 | Suzuki | 395/112 |

FOREIGN PATENT DOCUMENTS 57-155633 9/1982 Japan .

*Primary Examiner*—Gopal C. Ray

*Attorney, Agent, or Firm*—Wenderoth, Lind & Ponack

[57] ABSTRACT

A printing apparatus comprises a main control circuit 1, an image forming section 10, an interface 8 for communicating with an external host system 9, and an operation panel 20 including operating switches. The apparatus further comprises power cutoff circuits 32 and 33 for interrupting a power supply to the image forming section 10 in response to a command from the main control circuit 1. In the case where a signal input is applied from the operation panel 20 for designating the power saving mode while the printing data is being transmitted from the external host system 9, the transmission data from the external host system 9 are all received and discharged. The power saving mode is started after discharging the data. An erroneous operation can thus be prevented in starting or canceling the power saving mode.

10 Claims, 4 Drawing Sheets

PRINTING APPARATUS AND METHOD OF SAVING POWER OF THE SAME

BACKGROUND OF THE INVENTION

1. Technical Field of the Invention

The present invention relates to a printing apparatus for forming characters and images on a recording medium, more particularly to a printing apparatus capable of reducing the power consumption in the out-of-operation state and a method of reducing the power consumption.

2. Description of Related Art

Conventional printing apparatuses, such as a serial dot printer, have such a configuration in general that the electric power supplied to the whole apparatus is controlled by a single power switch, i.e., power supply to the whole apparatus is started by turning on a first power switch and stopped by turning off the first power switch.

In recent years, in order to reduce the power consumption, there has been proposed a printing apparatus comprising a second power switch for controlling the power supply to specific parts, such as a printing mechanism, and a display lamp when the apparatus is out of operation. The second power switch, which is composed of a relay and the like, is controlled by a main control circuit.

In such a printing apparatus, in the case where the printing apparatus does not perform printing, for example, where data such as printing data or printing control codes are not inputted from an external host system, like a computer, for a predetermined length of time, the main control circuit turns off the second power switch to carry out auto power-off control to suppress the power consumption of specific parts, and thereafter, the apparatus is put into a power saving mode in which power is supplied only to the main control circuit and the peripheral circuits thereof. In the case where data input is restarted from the external host system in this power saving mode, the second power switch is quickly turned on to activate the printing apparatus, thereby restoring the apparatus to the normal mode in which the apparatus is ready for printing. Also, in restoring to the normal mode, the power saving mode may be canceled forcibly through a panel switch operation by a user.

In this printing apparatus, the power consumption in power saving mode is very small, and therefore, the first power switch can be eliminated, by which a reduction in the number of parts and lowering of costs are realized.

As a similar related art, a data terminal unit directed to reduce power consumption has been disclosed (Japanese Unexamined Patent Publication JPA 57-155633 (1982)).

FIGS. 5A and 5B are control flowcharts for starting and releasing the power saving mode in a conventional printing apparatus, respectively. FIG. 5A shows a control routine for putting the apparatus into the power saving mode. The control routine is entered when the data input from an external host system stops for a predetermined length of time in the normal mode where the whole printing apparatus is supplied with power.

First, at step s1, counting with a power saving mode starting timer for measuring a predetermined length of time before putting the apparatus into the power saving mode is started, and at step s2, it is determined whether printing data is inputted from the external host system. When it is judged that the printing data is inputted, the process is shifted to step s3, where the timer is cleared, and then to step 4, where printing operations or feeding paper is carried out according to the printing data input. Then the process is returned to step s1.

When it is judged at step 2 that the printing data is not inputted, the process is shifted to step s5, where it is determined whether a predetermined length of time has passed from the start of counting with the power saving mode starting timer. Until it is judged that the predetermined length of time has lapsed, steps s2 and s5 are repeated. Upon judging that the predetermined length of time has lapsed, at step s6 the second power switch is turned off and supplying power is partially stopped, thus putting the apparatus into the power saving mode.

FIG. 5B shows a control routine for restoring the apparatus to the normal mode by canceling the power saving mode. First, at step p1, it is determined whether printing data has been inputted from the external host system. In the case where the data has been inputted, at step p3, the apparatus is restored from the power saving mode to the normal mode. In the case where it is judged at step p1 that the data has not been inputted, at step p2, it is determined whether the input operation has been performed on the operation panel. In the case where the input operation on the operation panel has not been performed, steps p1 and p2 are repeated. In the case where the input operation on the operating panel has been performed, the process is shifted to step p3, where the apparatus is restored to the normal mode.

However, when data is continuously transmitted from an external host system, in case of, for example, incorrect selection of data or paper size, it is desired to interrupt the printing operation of the printing apparatus. In such a case, in a printing apparatus provided with the first power switch, it is possible to interrupt the printing operation by turning off the first power switch. On the other hand, in a printing apparatus not provided with the first power switch, by operating a panel switch by a user, the apparatus is manually put into the power saving mode to stop the printing operation. Nevertheless, in the case where data is inputted from the external host system immediately after the manual stop of the printing operation, the power saving mode is immediately released and the printing operation is resumed, which is an operation against the user's will.

As a countermeasure, when the apparatus is put into the power saving mode during data transmission, the external host system may suspend subsequent data transmission and wait for restoration of the printing apparatus to the normal mode. As long as the power saving mode is continued, however, the external host system is required to be ready for resumption of data transmission, and therefore capabilities of processing other tasks are limited. Further, in the case of releasing the power saving mode and resuming the printing operation which was suspended midway, the remaining data yet to be printed are transmitted. Hence, an attempt to reprint all the data from the beginning requires a complicated operation.

It is also possible to prohibit the apparatus from being put into the power saving mode by an input from the operation panel while data is being received from an external host system and printed. In such a case, although the power saving mode is not released against user's will, the forcible stop of the printing operation becomes impossible.

As described above, with a printing apparatus in which the power saving mode is released by a data input from an external host system, a user's will may not be reflected in a manual stop during data receiving operation and printing operation.

SUMMARY OF THE INVENTION

It is hence an object of the invention to provide a printing apparatus capable of preventing the occurrence of an erroneous operation in entering into or releasing the power saving mode and a method of reducing the power consumption of the printing apparatus.

The invention provides a printing apparatus comprising:

an interface for transmitting and receiving a signal between the apparatus and an external host system;

an operation panel including signal input means;

an image former for forming an image on a recording medium;

a main controller for transmitting and receiving a signal among the interface, the operation panel and the image former and processing the signal in accordance with a predetermined program; and a power supply controller for stopping or limiting a power supply to the image former in accordance with a command from the main controller; wherein the power supply controller is activated on the basis of a predetermined signal input from the operation panel and the apparatus can be transferred to a power saving mode.

According to the invention, the printing apparatus can be transferred to the power saving mode any time in response to a user's will. As a result, the power consumption can be reduced while the apparatus is out of operation.

It is preferable in the invention that in the process of transfer to the power saving mode on the basis of the signal input from the operation panel, transferring the apparatus into the power saving mode can be canceled on the basis of a signal input from the operation panel.

Once the printing apparatus has been put into the power saving mode, restoration to normal mode requires a certain length of time for warming up the driving system or setting data. Assuming a transfer to the power saving mode due to an erroneous operation of the user, it is determined whether the canceling operation has been performed or not, and consequently inadvertently putting the apparatus into the power saving mode can be avoided.

It is preferable in the invention that the power saving mode is canceled on the basis of a signal input from the operation panel while the apparatus is in the power saving mode.

More specifically, even after the printing apparatus has been transferred to the power saving mode, the printing apparatus can be restored to normal operation any time in response to a user's will, thereby eliminating the inconveniences of the user.

It is preferable in the invention that the printing apparatus is transferred to the power saving mode on the basis of a signal input from the operation panel after the lapse of a predetermined length of time.

In other words, as described above, to allow the user to cancel the designation of the power saving mode immediately after the designation, a predetermined length of time is allowed for confirming whether canceling putting the apparatus into the power saving mode has been issued.

The invention also provides a printing apparatus wherein:

when a signal input from an external host system stops for a predetermined length of time, or when a predetermined signal input from the operation panel occurs, the power supply controller is activated and the printing apparatus is transferred into the power saving mode, the power saving mode is canceled by a signal input from either the external host system or the operation panel, and when the signal input from the operation panel, commanding the power saving mode, occurs during transmission of printing data from the external host system, the printing apparatus is transferred to the power saving mode after the lapse of a predetermined length of time from completion of the data transmission.

According to the invention, since transmission of a series of data from the external host system is completed by the time of transfer to the power saving mode, the conventional inconvenience of immediate restoration to the normal mode by the remaining data retransmission after transfer to the power saving mode is eliminated. Consequently, the power saving mode can be started according to user's will.

The external host system can transmit a series of printing data at a time and therefore the external host system is not restricted by the state of the printing apparatus transferred to the power saving mode, with the result that the external host system is released from the data transmission task.

It is preferable in the invention that the printing apparatus comprises data storage means for storing printing data sent from the external host system, and when the printing apparatus is transferred to the power saving mode on the basis of a signal input from the operation panel, the printing data from the external host system is not stored in the data storage means.

More specifically, by eliminating the step of storing the printing data from the external host system in the data storage means when transferring to the power saving mode, the time required for transferring a series of data is shortened, so that quick transfer to the power saving mode is made possible. The data transmission task can also be completed quickly.

It is preferable in the invention that the interface is based on a parallel interface including a busy signal, a strobe signal and a plurality of data signals, and in the case where the printing apparatus is transferred to the power saving mode on the basis of a signal input from the operation panel, the busy signal is held at a low level to permit the external host system to continuously perform the data transmission operation.

More specifically, by holding the busy signal at a low level, the external host system judges that the printing apparatus is always ready for receiving data. Consequently transmission of a series of data can be completed for a very short period.

It is preferable in the invention that by detecting the strobe signal, it is judged that the data transmission operation of the external host system is completed.

More specifically, the strobe signal is a signal for informing the printing apparatus that the transmission data from the external host system has been outputted, so that the operating conditions of the external host system can be reliably judged by detecting the presence or absence of the strobe signal.

The invention also provides a method of saving power of a printing apparatus.

The method comprising the step of activating the power supply controller on the basis of a predetermined signal input from the operation panel and thereby transferring the apparatus to the power saving mode.

According to the invention, the printing apparatus can be transferred to the power saving mode any time according to a user's will, and therefore the power consumption while the apparatus is out of operation can be reduced.

The invention also provides a method of saving power of a printing apparatus comprising the steps of:

in the case where a signal input from an external host system stops for a predetermined length of time, or in the case where a predetermined signal input from the operation panel occurs, activating the power supply controller to thereby transfer the printing apparatus into the power saving mode, canceling the power saving mode by a signal input from either the external host system or the operation panel, and in the case where the signal input from the operation panel, commanding the power saving mode, occurs during transmission of printing data from the external host system, transferring the printing apparatus to the power saving mode after the lapse of a predetermined length of time from completion of the data transmission.

According to this method, since transmission of a series of data from the external host system is completed by the time of transfer to the power saving mode, the conventional inconvenience of immediate restoration to the normal mode by the remaining data retransmission after transfer to the power saving mode is eliminated. Consequently, the power saving mode can be started according to the user's will.

The external host system can transmit a series of printing data at a time and therefore is not restricted by the state of the printing apparatus transferred to the power saving mode, with the result that the external host system is released from the data transmission task.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

Figure 1:
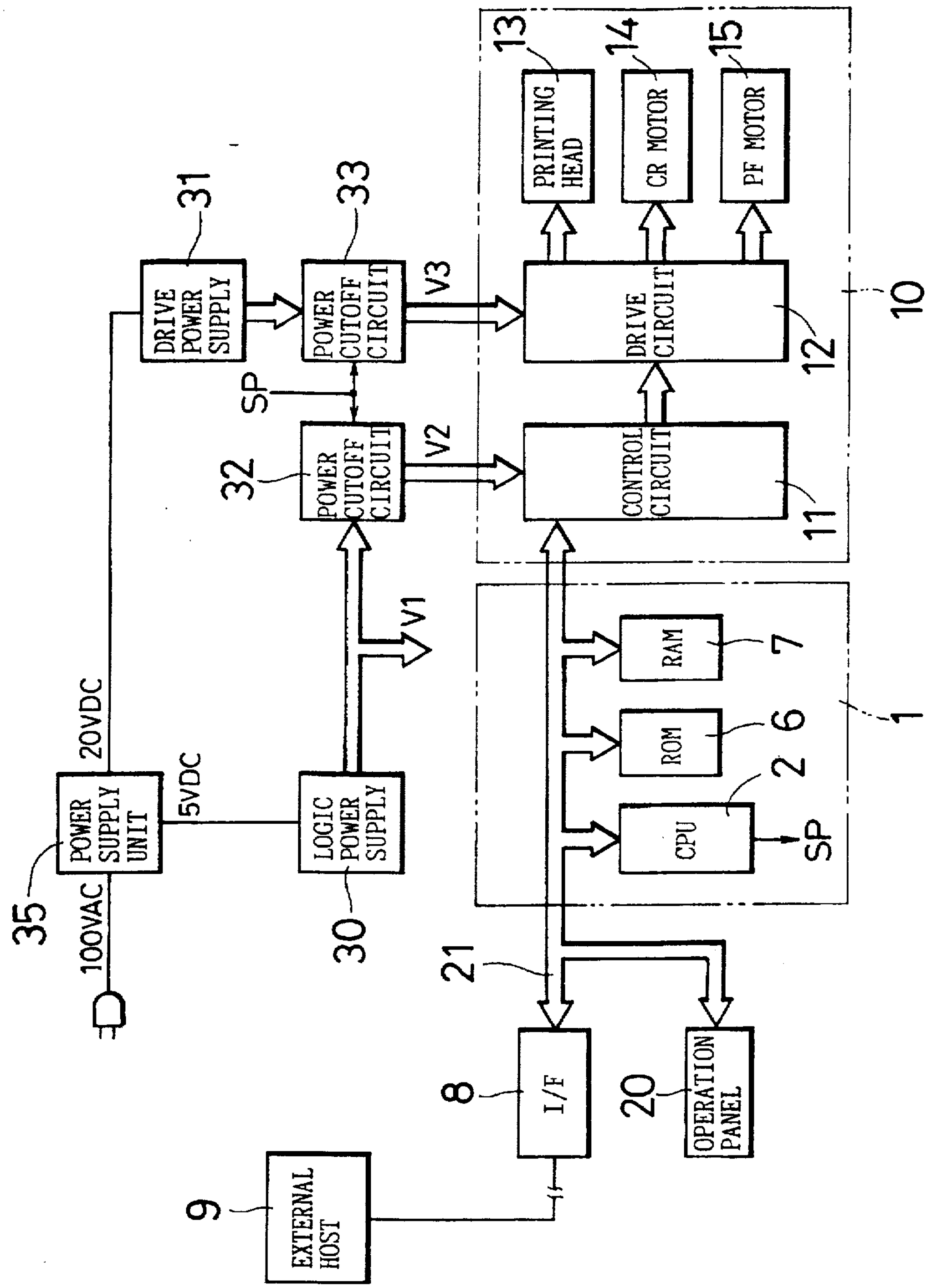
FIG. 1 is a block diagram showing an electrical configuration of an embodiment of the invention.

Now referring to the drawings, preferred embodiments of the invention are described below.

FIG. 1 is a block diagram showing an electrical configuration of an embodiment of the invention. A printing apparatus comprises a main control circuit 1 for controlling the operation of the whole apparatus, an image-forming section 10 for forming characters and images on a recording medium while transporting the recording medium, an interface (I/F) 8 for transmitting and receiving signals between the printing apparatus and an external host system 9 such as computer, and an operation panel 20 in which signal input means such as an operating switch and signal display means such as an LED (light-emitting diode) are incorporated. These components are connected to each other by a bus 21 composed of a plurality of signal lines.

The main control circuit 1 comprises a CPU (central processing unit) 2, a ROM (read-only memory) 6 which is a nonvolatile memory, and a RAM (random access memory) 7 where data can be rewritten.

The CPU 2 performs such signal processing operations as data input/output, data transfer and arithmetic operations according to a program stored in the ROM 6, and includes a timer for measuring a lapse time and an interrupt generation circuit for receiving an interrupt signal from the interface 8 and the operation panel 20.

In the ROM 6 a control program and data required for the operation of the CPU 2 and data required for printing such as character-codes and -fonts are stored. The RAM 7 is used as a work area of the CPU 2, a receiving buffer for temporarily storing the data received from the external host system 9, a printing buffer for developing bitmap data to be printed and the like.

The image-forming section 10 includes a printing head 13 for printing on the recording medium, a CR (carriage) motor 14 for transporting a carriage mounting the printing head 13 along the width direction of the recording medium, a PF (paper feed) motor 15 for transporting by a predetermined amount, inserting or ejecting the recording medium, a drive circuit 12 for driving these components, and a control circuit 11 for controlling the drive circuit 12 on the basis of a command from the main control circuit 1.

The interface 8 receives such data as printing data and printing control codes sent from the external host system 9 and outputs them to the main control circuit 1, or conversely receives the status information of the printing apparatus from the main control circuit 1 and transmits them to the external host system 9. The external host system 9 and the interface 8 are connected to each other, for example, by a parallel interface scheme called the Centronix standard, under which typical signals are defined a busy signal BUSY, an error signal ERR, a strobe signal STB and data signals DATA 1 to 8. The strobe signal STB outputted from the external host system 9, which is low-active, is normally at level "1" (high level). After the external host system 9 outputs the data signals DATA 1 to 8 to the printing apparatus, the strobe signal STB turns to "0" (low-level) state, and after a predetermined time, returns to "1" state. This operation is repeated to transfer data byte by byte. As long as the strobe signal STB remains in "0" state, the interface 8 sets the busy signal BUSY to "1" state for a predetermined length of time and makes the external host system 9 ready for transmission. The error signal ERR, on the other hand, turns to "0" state and suspends the transmission operation of the external host system 9 in the case where the printing apparatus develops an irreparable malfunction. Although the foregoing description of the embodiment concerns the case using the parallel interface scheme, the invention is applicable with effect to the serial interface scheme such as RS-232C.

The operation panel 20 includes signal input switches including a switch for selecting between on-line and off-line modes of the printing apparatus, a switch for commanding insertion/ejection or line spacing of the recording paper, and a switch for putting the apparatus into the power saving mode by interrupting the operation of the CPU 2. The operation panel 20 further includes a signal display lamp such as an LED adapted to turn on when the printing apparatus is ready for printing. The on-line mode is defined as the one in which a signal input from the external host system 9 is allowable and the operation is performed on the basis of the signal while partially restricting a signal input from the operation panel 20. The off-line mode, on the other hand, is defined as the one in which a signal input from the external host system 9 is limited while at the same time a signal input from the operation panel 20 is allowable and the printing apparatus performs on the basis of the signal input.

This printing apparatus comprises a logic power supply 30 for supplying electric power to a logic circuit for handling digital signals, and a drive power supply 31 for supplying electric power to a unit requiring a comparatively large power such as a motor. A power supply unit 35 is supplied with power from a commercial power supply of 100V AC etc. and after voltage conversion and rectification, supplies, for example, 5V DC to the logic power supply 30 and 20V DC to the drive power supply 31.

The logic power supply 30 outputs 5V DC which is adapted to TTL (transistor transistor logic) or CMOS (complementary metal oxide semiconductor), to a power line V1 and supplies power to the main control circuit 1, the interface 8 and the operation panel 20. A part of the power line V1 also supplies power to a part of the operation panel 20 and the control circuit 11 of the image-forming section 10 as a power line V2 through the power cutoff circuit 32 such as a relay. The drive power supply 31 supplies power to the drive circuit 12 of the image-forming section 10 as a power line V3 through the power cutoff circuit 33 such as a relay. The power cutoff circuits 32 and 33 supply power to the power lines V2 and V3 when a power saving signal SP from the CPU 2 is in "1" state, and interrupts the power supply to the power lines V2 and V3 when the power saving signal SP is in "0" state.

Now, the power saving mode of a printing apparatus will be described. With respect to transfer of the printing apparatus to the power saving mode, the following two conditions are possible: (a) when the signal input from the external host system 9 stops for a predetermined length of time, and (b) when a signal is inputted from the operation panel 20. First, with regard to the condition (a), a timer is activated each time a signal is inputted from the external host system 9, and with the lapse of a predetermined length of time from the last signal input, the CPU 2 maintains the power saving signal SP in "0" state and the apparatus is put into the power saving mode. With condition (b), on the other hand, when a specific switch is pressed on the operation panel 20, the CPU 2 maintains the power saving signal SP in "0" state and the apparatus is put into the power saving mode.

The cancellation of the power saving mode will be explained. The following two conditions are possible with respect to restoration of the printing apparatus from the power saving mode to the normal mode: (c) when a signal input from the external host system 9 begins, and (d) when a signal is inputted from the operation panel 20. First, with regard to (c), upon reversal of the strobe signal STB from the external host system 9 to "0" state, the interface 8 detects the level change and generates an interrupt signal to the CPU 2, which in turn executes a control program corresponding to the interrupt. At the same time, while maintaining the power saving signal SP in "1" state, the apparatus returns to the normal mode. On the other hand, with regard to (d), upon depression of a specific switch of the operation panel 20, an interrupt signal is applied to the CPU 2, which in turn executes a control program corresponding to the particular interrupt and the apparatus returns to the normal mode while maintaining the power saving signal SP in "1" state.

Figure 2:
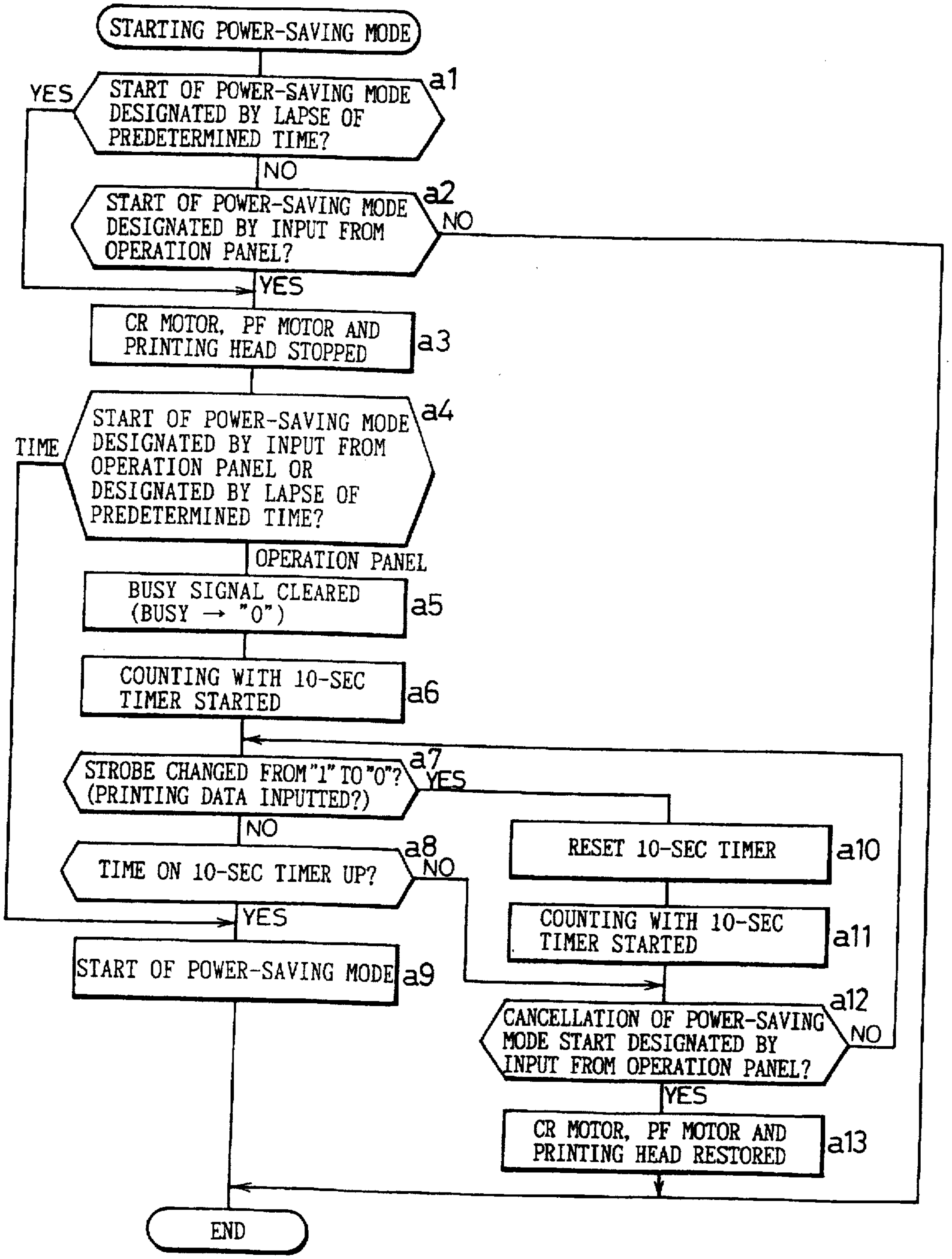
FIG. 2 is a flowchart showing an operation of putting the apparatus into the power saving mode.

FIG. 2 is a flowchart showing the operation for putting the apparatus into the power saving mode. First, at step a1 it is judged whether a signal input from the external host system 9 stops for a predetermined length of time and putting the apparatus into the power saving mode is designated by the timer on the basis of the lapse of a predetermined length of time. In the case where putting the apparatus into the power saving mode is so designated, the process proceeds to step a3, where the printing head 13, the CR motor 14 and the PF motor 15 of the image-forming section 10 are temporarily stopped.

In the case where it is judged at step a1 that putting the apparatus into the power saving mode is not designated, it is judged at step a2 whether putting the apparatus into the power saving mode is designated by a signal input from the operation panel 20. In the case where it is judged at step a2 that putting the apparatus into the power saving mode is not designated, the process is terminated and the normal mode is continued. In the case where it is judged at step a2 that putting the apparatus into the power saving mode is designated through the operation panel 20, the operation of each driving system of the image forming section 10 is temporarily stopped at step a3.

It is judged at step a4 whether putting the apparatus into the power saving mode is designated on the basis of the lapse of a predetermined length of time or through the operation panel. With the designation on the basis of the lapse of a predetermined length of time, the process proceeds to step a9, where the apparatus is put into the power saving mode, so that the CPU 2 sets the power saving signal SP to "0" state. The power cutoff circuits 32 and 33 are thus activated to stop power supply to the image forming section 10, etc.

In the case where it is judged at step a4 that putting the apparatus into the power saving mode is designated through the operation panel, the process proceeds to step a5, where the busy signal BUSY of the interface section 8 is forcibly cleared to "0" state, thereby permitting data transmission of the external host system 9.

Figure 3:
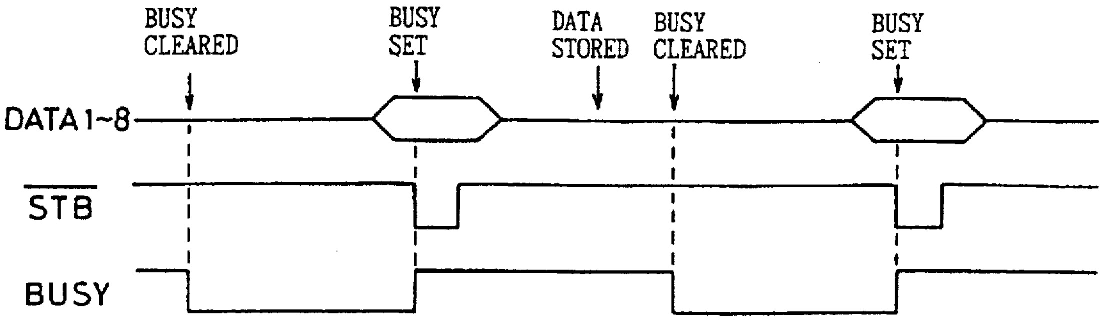
FIG. 3 is a timing diagram showing a procedure for transmitting data in the normal mode

FIG. 3 is a timing diagram showing a procedure for data transmission in normal mode. The external host system 9 constantly monitors the busy signal BUSY of the interface 8, and when the busy signal BUSY is put into "0" state, the external host system 9 outputs printing data as data signals DATA 1 to 8. The strobe signal STB is inverted to "0" state at the time point when the data signals are stabilized. Next, the printing apparatus turns the busy signal BUSY to "1" state and thus holds the external host system 9 in the waiting state for data transmission. A little time later, the data signals DATA 1 to 8 are stored in the receiving buffer of the RAM 7, and in order to resume the next data transfer, the busy signal BUSY is set to "0" state. By repeating this procedure, byte-by-byte data transfer is sequentially accomplished.

Figure 4:
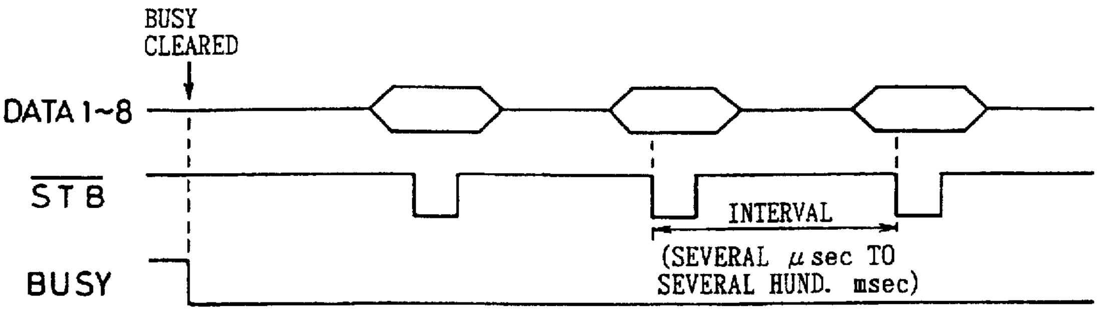
FIG. 4 is a timing diagram showing a procedure for transmitting data in step a5 of FIG. 2.

FIG. 4 is a timing diagram showing a procedure for data transmission of step a5 in FIG. 2. When data transmission by the external host system 9 is permitted by clearing the busy signal BUSY of the interface 8 to "0" state, the external host system 9 outputs printing data as data signals DATA 1 to 8 and inverts the strobe signal STB to "0" level. Nevertheless, the busy signal BUSY is still held at "0" level, and the external host system 9 begins the next data transfer. Byte-by-byte data transfer is thus continuously accomplished. The interval between data transfers, which is dependent on the operating speed of the external host system 9, is generally about several μsec to several hundred msec. In the process, the printing apparatus receives and discards the transmitted printing data without storing them in the RAM 7, which printing data are not utilized for the printing operation. Any method in which the transmitted printing data is ignored is acceptable. The reception and discharge of the printing data transmitted from the external host system 9 can thus be realized.

At step a5 in FIG. 2, the busy signal BUSY is cleared to "0" state, followed by step a6, where counting with a 10-sec timer is started. Then it is judged at step a7 whether the strobe signal STB has inverted from "1" to "0" state.

The foregoing description concerns the case in which the fall of the strobe signal STB is detected. Nevertheless, a method is also acceptable in which the rise or level of the signal is detected. The counting time of the timer is set to 10 seconds because a considerable allowance is incorporated against the data transfer interval of the external host system 9 which is about several μ sec to several hundred msec. The counting time therefore is not necessarily limited to 10 seconds.

In the case where it is judged at step a7 that the strobe signal STB has reversed from "1" to "0" state, that indicates that new printing data is inputted. The input printing data is discharged, and at step a10 the 10-sec timer is reset, followed by step all, where the counting with the timer is resumed. At step a12 it is judged whether cancellation of the designation for putting the apparatus into the power saving mode is designated by a signal input from the operation panel 20. In the case where such cancellation is not designated, the process returns to step a7, where counting with the timer is resumed. In the case where cancellation of the start of the power saving mode is designated by the operation panel 20, the process proceeds to step a13. The operation of the printing head 13, the CR motor 14 and the PF motor 15 of the image forming section 10 thus is restored, thereby completing the routine.

On the other hand, in the case where the strobe signal STB is not inverted at step a7, the process proceeds to step a8, where it is determined whether the 10-sec timer has completed the count. Before the counting time of 10 seconds, the process proceeds to step a12, and in the case where a designation through the operation panel 20 is not conducted, the process returns to step a7, where the count with the timer is continued. In the case where at step a8 it is judged that the 10-see timer has timed out, the process proceeds to step a9 where the power saving mode is started, so that the CPU 2 activates the power cutoff circuits 32 and 33 by setting the power saving signal SP to "1" state and thus stops power supply to the image-forming section 10, etc.

Thus, in the case where the power saving mode is started forcibly by a command from the operation panel 20 in this way, the transmission data from the external host system 9 is received and discharged by holding the busy signal BUSY at "0" state, and the power saving mode is started after completion of the entire transmission task of the external host system 9.

Figure 5A:
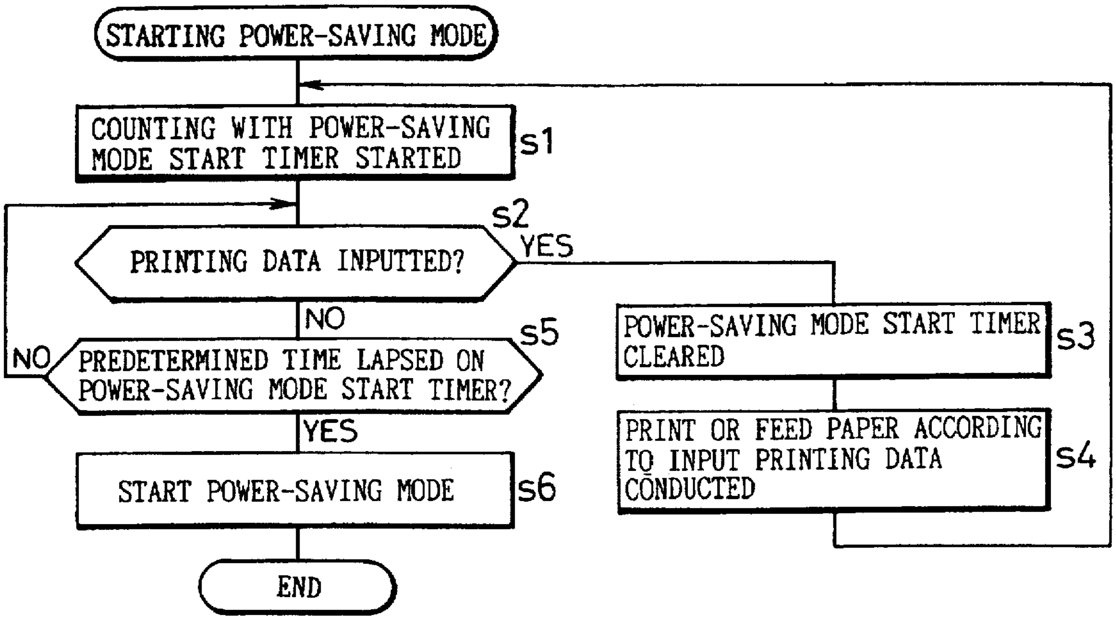
FIG. 5A PRIOR ART
FIGS. 5A and 5B are control flowcharts for putting the apparatus into and canceling the power saving mode in a conventional printing apparatus.
Figure 5B:
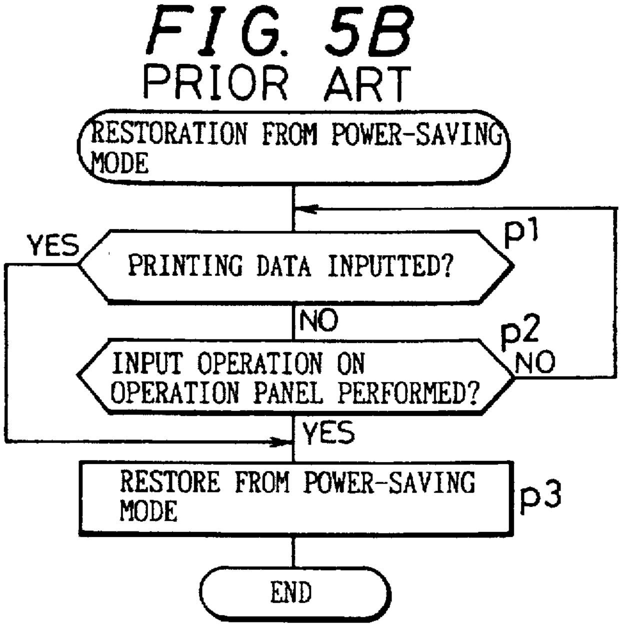
FIG. 5B PRIOR ART

Restoration from power saving mode to normal mode is performed, as shown in FIG. 5B, by data input from the external host system 9 or by a signal input from the operation panel 20.

Although in the above-mentioned embodiments a mechanical switch for the power cutoff circuits 32 and 33 such as a relay is used, the invention is of course applicable also in the case where the CPU is set in HALT state or the clocks supplied to each part are stopped for suppressing power consumption by the peripheral circuits and the drive means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A printing apparatus comprising:

interface means for transmitting and receiving a signal between the apparatus and an external host system;

an operation panel including signal input means;

image forming means for forming an image on a recording medium;

main control means for transmitting and receiving a signal among the interface means, the operation panel and the image forming means and processing the signal in accordance with a predetermined program; and power supply control means for stopping or limiting a power supply to the image forming means in accordance with a command from the main control means; wherein the power supply control means is activated on the basis of a predetermined signal input from the operation panel and the apparatus is transferred to a power saving mode.

2. The printing apparatus of claim 1, wherein in the process of transfer to the power saving mode on the basis of the signal input from the operation panel, transferring the apparatus into the power saving mode is canceled on the basis of a signal input from the operation panel.

3. The printing apparatus of claim 1, wherein the power saving mode is canceled on the basis of a signal input from the operation panel while the apparatus is in the power saving mode.

4. The printing apparatus of claim 1, wherein the printing apparatus is transferred to the power saving mode on the basis of a signal input from the operation panel after the lapse of a predetermined length of time.

5. A printing apparatus comprising:

interface means for transmitting and receiving a signal between the apparatus and an external host system;

an operation panel including signal input means;

image forming means for forming an image on a recording medium;

main control means for transmitting and receiving a signal among the interface means, the operation panel and the image forming means and processing the signal in accordance with a predetermined program; and power supply control means for stopping or limiting a power supply to the image forming means in accordance with a command from the main control means; wherein when a signal input from an external host system stops for a predetermined length of time, or when a predetermined signal input from the operation panel occurs, the power supply control means is activated and the printing apparatus is transferred into a power saving mode, the power saving mode is canceled by a signal input from either the external host system or the operation panel, and when the signal input from the operation panel, commanding the power saving mode, occurs during transmission of printing data from the external host system, the printing apparatus is transferred to the power saving mode after the lapse of a predetermined length of time from completion of the data transmission.

6. The printing apparatus of claim 5, wherein the printing apparatus comprises data storage means for storing printing data sent from the external host system in a normal mode, and when the printing apparatus is transferred to the power saving mode on the basis of a signal input from the operation panel, the printing data from the external host system is not stored in the data storage means.

7. The printing apparatus of claim 6, wherein the interface means is based on a parallel interface including a busy signal, a strobe signal and a plurality of data signals; and when the printing apparatus is transferred to the power saving mode on the basis of a signal input from the operation panel, the busy signal is held at a low level to permit the external host system to continuously perform the data transmission operation.

8. The printing apparatus of claim 5, wherein the interface means is based on a parallel interface including a busy signal, a strobe signal and a plurality of data signals, and by detecting the strobe signal, it is determined that the data transmission operation of the external host system is completed.

9. A method of saving power of a printing apparatus; the printing apparatus including interface means for transmitting and receiving a signal between the apparatus and an external host system;

an operation panel including signal input means;

image forming means for forming an image on a recording medium;

main control means for transmitting and receiving a signal among the interface means, the operation panel and the image forming means and processing the signal in accordance with a predetermined program; and power supply control means for stopping or limiting a power supply to the image forming means in accordance with a command from the main control means;

said method comprising the step of activating the power supply control means on the basis of a predetermined signal input from the operation panel and thereby transferring the apparatus to a power saving mode.

10. A method of saving power of a printing apparatus; the printing apparatus including interface means for transmitting and receiving a signal between the apparatus and an external host system;

an operation panel including signal input means;

image forming means for forming an image on a recording medium;

main control means for transmitting and receiving a signal among the interface means, the operation panel and the image forming means and processing the signal in accordance with a predetermined program; and power supply control means for stopping or limiting a power supply to the image forming means in accordance with a command from the main control means;

said method comprising the steps of:

activating the power supply control means and thereby transferring the printing apparatus into a power saving mode when a signal input from an external host system stops for a predetermined length of time, or when a predetermined signal input from the operation panel occurs;

canceling the power saving mode by a signal input from either the external host system or the operation panel, and when the signal input from the operation panel, commanding the power saving mode, occurs during transmission of printing data from the external host system, transferring the printing apparatus to the power saving mode after the lapse of a predetermined length of time from completion of the data transmission.

* * * * *